(12) United States Patent
Ender

(10) Patent No.: US 9,989,691 B2
(45) Date of Patent: Jun. 5, 2018

(54) LIGHTGUIDE AND LIGHT SOURCE INCORPORATING SAME

(75) Inventor: David A. Ender, New Richmond, WI (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 1113 days.

(21) Appl. No.: 13/379,829

(22) PCT Filed: Jun. 25, 2010

(86) PCT No.: PCT/US2010/039997
§ 371 (c)(1),
(2), (4) Date: Dec. 21, 2011

(87) PCT Pub. No.: WO2011/008473
PCT Pub. Date: Jan. 20, 2011

(65) Prior Publication Data
US 2012/0099343 A1 Apr. 26, 2012

Related U.S. Application Data

(60) Provisional application No. 61/221,223, filed on Jun. 29, 2009.

(51) Int. Cl.
*F21V 8/00* (2006.01)
*F21S 8/10* (2006.01)
*B60Q 1/30* (2006.01)

(52) U.S. Cl.
CPC .......... *G02B 6/0036* (2013.01); *F21S 48/215* (2013.01); *F21S 48/2243* (2013.01);
(Continued)

(58) Field of Classification Search
CPC ........................... G02B 6/0038; G02B 6/0036
(Continued)

(56) References Cited

U.S. PATENT DOCUMENTS 5,165,772 A 11/1992 Wu
5,779,338 A * 7/1998 Ishikawa et al. ............. 362/625
(Continued)

FOREIGN PATENT DOCUMENTS

CA 2135940 5/1995
EP 0399507 11/1990
(Continued)

OTHER PUBLICATIONS

International Search Report for PCT/US2010/039997, dated Jan. 11, 2011, 7 pages.
(Continued)

*Primary Examiner* — Jong-Suk (James) Lee
*Assistant Examiner* — Christopher E Dunay
(74) *Attorney, Agent, or Firm* — Yufeng Dong; Kristofor L. Storvick

(57) ABSTRACT

A lightguide (100) is disclosed. The lightguide includes a plurality of light extractors (120-123). Each light extractor is designed primarily to extract light that propagates within the lightguide and is incident on the light extractor from a first direction and reflect light that propagates within the lightguide and is incident on the light extractor from a second direction different than the first direction, toward another light extractor, where the other light extractor extracts the reflected light.

17 Claims, 13 Drawing Sheets

(52) U.S. Cl.
CPC ....... *F21S 48/2268* (2013.01); *F21S 48/2281* (2013.01); *B60Q 1/302* (2013.01)

(58) Field of Classification Search
USPC ................................ 362/97.1–97.4, 615–620
See application file for complete search history.

(56) References Cited

U.S. PATENT DOCUMENTS

| | | | |
|---|---|---|---|
| 6,908,219 | B1 | 6/2005 | Reiss |
| 2002/0071267 | A1 | 6/2002 | Lekson |
| 2005/0122591 | A1* | 6/2005 | Parker ..................... F21V 5/00 359/619 |
| 2006/0198598 | A1* | 9/2006 | Fang et al. ................... 385/146 |
| 2007/0285946 | A1* | 12/2007 | Lin et al. ...................... 362/615 |
| 2009/0067151 | A1 | 3/2009 | Sahlin |
| 2009/0116263 | A1* | 5/2009 | Chen et al. ................... 362/615 |
| 2009/0190069 | A1* | 7/2009 | Dejima ............... G02B 6/0036 349/65 |
| 2009/0296373 | A1* | 12/2009 | Chang ........................ 362/97.1 |
| 2010/0073597 | A1* | 3/2010 | Bierhuizen et al. ............ 349/62 |
| 2010/0091480 | A1* | 4/2010 | Holten ........................ 362/97.1 |
| 2010/0288614 | A1 | 11/2010 | Ender |

FOREIGN PATENT DOCUMENTS

| | | |
|---|---|---|
| JP | H08-271891 | 10/1996 |
| JP | H10-153779 | 6/1998 |
| JP | 2002-22966 | 1/2002 |
| JP | 3644787 | 5/2005 |
| JP | 2008-27665 | 2/2008 |
| JP | 2008-27757 | 2/2008 |
| JP | 2008-84544 | 4/2008 |
| JP | 2008-311210 | 12/2008 |
| WO | WO 1994-014632 | 7/1994 |
| WO | WO 2000-050807 | 8/2000 |
| WO | WO 2003-066374 | 8/2003 |
| WO | WO 2006/039315 | 4/2006 |
| WO | WO 2007-137102 | 11/2007 |
| WO | WO 2008-144644 | 11/2008 |

OTHER PUBLICATIONS

Written Opinion for PCT/US2010/039997, dated Jan. 11, 2011, 10 pages.

* cited by examiner

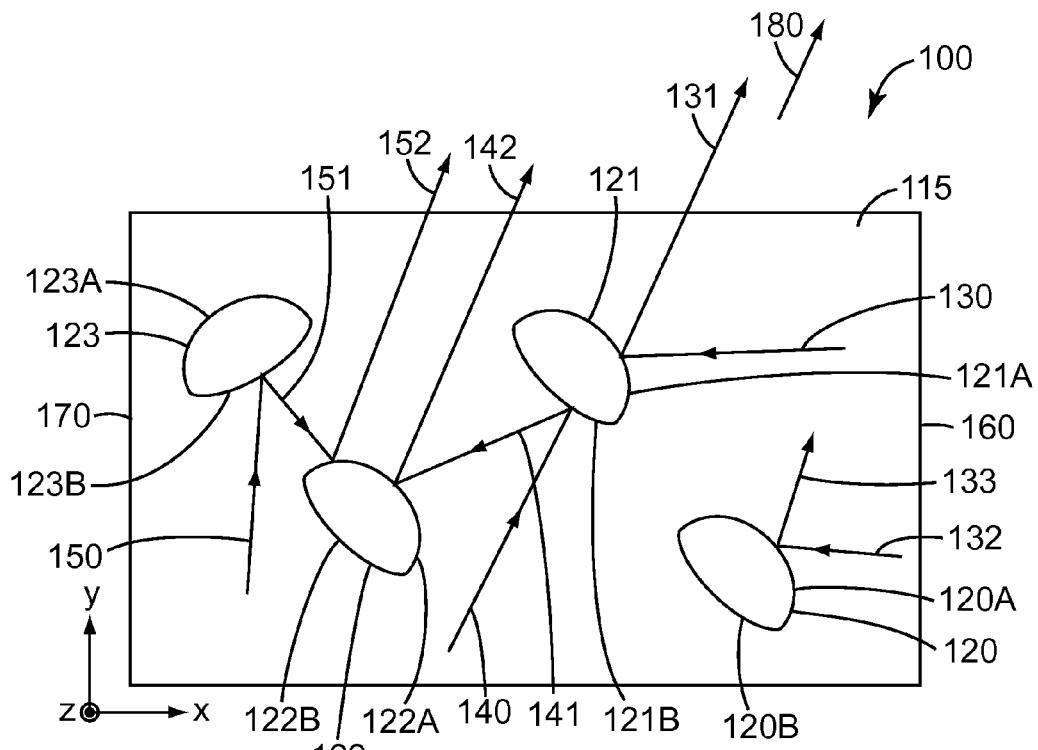
*Fig. 1*
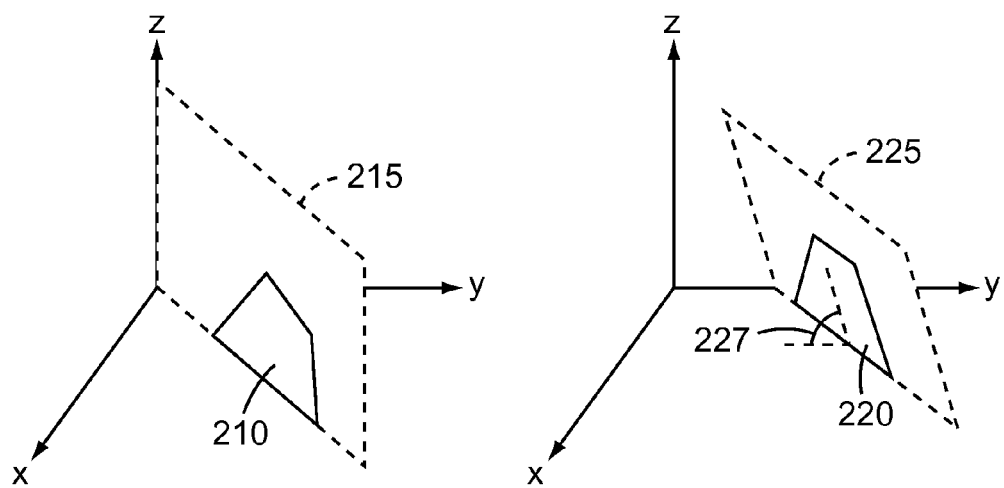
*Fig. 2A*     *Fig. 2B*

LIGHTGUIDE AND LIGHT SOURCE INCORPORATING SAME

CROSS REFERENCE TO RELATED APPLICATIONS

This application is a national stage filing under 35 U.S.C. 371 of PCT/US2010/039997, filed on Jun. 25, 2010, which claims priority to U.S. Provisional Application No. 61/221,223, filed on Jun. 29, 2009, the disclosure of which is incorporated by reference in its/their entirety herein.

FIELD OF THE INVENTION

This invention generally relates to lightguides. The invention is further applicable to optical systems, such as display systems, incorporating such lightguides.

BACKGROUND

Light sources have many applications such as general lighting or display applications. In many applications, it is desired that a light source efficiently emit uniform light over a desired area and in a particular direction. Many light sources include one or more lamps and means to provide an extended emission area and direct the emitted light along a desired direction.

SUMMARY OF THE INVENTION

Generally, the present invention relates to lightguides. In one embodiment, a lightguide includes a plurality of light extractors. Each light extractor includes a first portion that is designed primarily to extract light from the lightguide primarily along a first direction. Each light extractor also includes a second portion that is designed primarily to reflect light primarily toward the first portion of at least one other light extractor for light extraction primarily along the first direction. In some cases, the light extractors in the plurality of light extractors are depressions. In some cases, the plurality of light extractors form a regular array. In some cases, the first portion of each light extractor includes a planar portion. In some cases, the first portion of each light extractor is piecewise planar. In some cases, the first portion of each light extractor includes a curved portion. In some cases, the first portion of each light extractor is piecewise curved. In some cases, the plurality of light extractors includes a first plurality of light extractors, the first portions of which face a first edge of the lightguide and the second portions of which face away from the first edge, and a second plurality of light extractors different from the first plurality of light extractors, the first portions of which face a second edge of the lightguide and the second portions of which face away from the second edge. In some cases, the first and second pluralities of light extractors are mirror images of each other. In some cases, the light extractors are in the bottom surface of the lightguide. In some cases, a rear window assembly or a trunk lid of a motor vehicle includes the lightguide. In some cases, each light extractor includes a third portion that is not primarily designed to either extract light or reflect light toward the first portion of at least one other light extractor for light extraction. In some cases, the third portion is primarily designed to direct light to other portions of the lightguide.

In another embodiment, a lightguide includes a first plurality of light extractors that is disposed proximate a first edge of the light guide. Each light extractor in the first plurality of light extractors includes a planar side that is designed primarily to reflect light toward at least one other light extractor for light extraction. The planar sides of the light extractors substantially have the same orientation. The planar side of each light extractor does not face the planar side of any neighboring light extractor. In some cases, the variation in directions of the surface normals of the planar sides of the light extractors in the first plurality of light extractors is not greater than about 20%, or not greater than about 10%, or not greater than about 5%. In some cases, the planar side of each light extractor does not face the planar side of any other light extractor. In some cases, each light extractor includes a non-planar side opposite the planar side designed primarily to extract light from the lightguide, and the planar side of each light extractor is designed primarily to reflect light toward the non-planar side of at least one other light extractor for light extraction.

In another embodiment, a light source includes a lightguide that includes a plurality of light extractors. Each light extractor includes a first portion that is designed primarily to extract light from the lightguide and a second portion that is designed primarily to reflect light toward the first portion of another light extractor for extraction from the lightguide. The light source also includes a first lamp that is disposed along a first edge of the lightguide and a second lamp that is disposed along a second edge of the lightguide different than the first edge. The plurality of light extractors includes a first plurality of light extractors, the second portions of which are designed primarily to reflect light that is emitted by the second lamp toward the first portion of at least one other light extractor in the first plurality of light extractors for extraction from the lightguide. The plurality of light extractors also includes a second plurality of light extractors different from the first plurality of light extractors, the second portions of which are designed primarily to reflect light that is emitted by the first lamp toward the first portion of at least one other light extractor in the second plurality of light extractors for extraction from the lightguide. In some cases, the first portions of the light extractors in the first plurality of light extractors face the first lamp and the second portions of the light extractors in the first plurality of light extractors face the second lamp, and the first portions of the light extractors in the second plurality of light extractors face the second lamp and the second portions of the light extractors in the second plurality of light extractors face the first lamp. In some cases, the first plurality of light extractors is disposed in a first area of the lightguide and the second plurality of light extractors is disposed in a second area of the lightguide different than the first area. In some cases, the first portions of the light extractors in the first and second pluralities of the light extractors extract light primarily along the same first direction. In some cases, the lightguide generally defines a plane and a normal to the plane, where the first direction is different than the normal direction.

In another embodiment, a lightguide includes a plurality of light extractors. Each light extractor is designed primarily to extract light that propagates within the lightguide and is incident on the light extractor from a first direction and reflect light that propagates within the lightguide and is incident on the light extractor from a second direction different than the first direction, toward another light extractor, where the other light extractor extracts the reflected light. In some cases, the second direction is opposite the first direction. In some cases, each light extractor has a first portion that is designed primarily to extract light and a second portion that is designed primarily to reflect light toward the first portion of another light extractor.

BRIEF DESCRIPTION OF DRAWINGS

The invention may be more completely understood and appreciated in consideration of the following detailed description of various embodiments of the invention in connection with the accompanying drawings, in which:

FIG. 1 is a schematic top-view of a lightguide;

FIGS. 2A-2C are schematic three-dimensional views of portions of different light extractors;

In the specification, a same reference numeral used in multiple figures refers to the same or similar elements having the same or similar properties and functionalities.

DETAILED DESCRIPTION

Figure 2C:
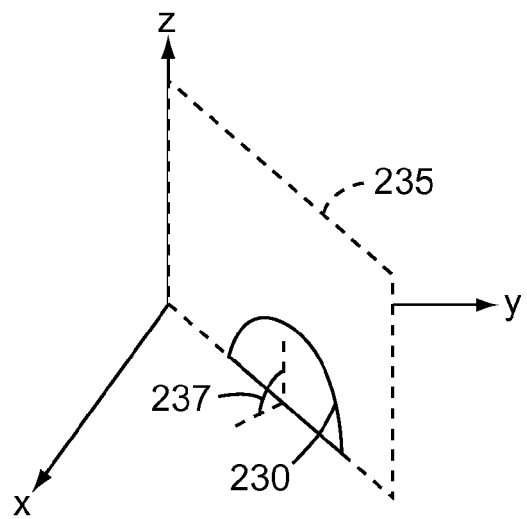

This invention generally relates to lightguides that extract light having a desired intensity distribution, such as a substantially uniform intensity distribution, across an emitting surface of the lightguide. In some cases, the emitted light is along a direction that is different than the direction normal to the lightguide. The disclosed lightguides are capable of extracting light that propagated in several, such as opposing, directions. The disclosed lightguide extract light primarily by reflecting the light from one or more pluralities of light extracting microstructures in the lightguide. At least some of the microstructures include a first portion that is designed primarily to extract light and a second portion that is designed primarily to reflect light toward the first portion of one or more other microstructures, such as a neighboring microstructure, for light extraction.

FIG. 1 is a schematic top-view of a lightguide 100 that is generally disposed in, or generally defines, an xy-plane, although in some cases, lightguide 100 can be a non-planar lightguide, such as a curved lightguide. Lightguide 100 receives light from one or more lamps (not shown expressly in FIG. 1) and emits the received light from an emitting surface 115 of the lightguide. Lightguide 100 includes a plurality of light extractors including light extractors 120-123 for extracting light from the lightguide. Each light extractor includes a first portion that is designed primarily to extract light from the lightguide primarily along an emitting direction 180 that is not in the xy-plane, and a second portion that is designed primarily to reflect light primarily toward the first portion of at least one other light extractor, such as the first portion of a neighboring light extractor, for light extraction primarily along the emitting direction. For example, light extractor 120 includes a first portion 120A and a second portion 120B, light extractor 121 includes a first portion 121A and a second portion 121B, light extractor 122 includes a first portion 122A and a second portion 122B, and light extractor 123 includes a first portion 123A and a second portion 123B. First portions 120A-123A are designed primarily to extract light from lightguide 100 primarily along emitting direction 180. For example, first portion 121A extracts an incident light ray 130 as an extracted light ray 131 propagating along emitting direction 180, and first portion 120A extracts an incident light ray 132 as an extracted light ray 133 propagating along emitting direction 180.

Second portions 120B-123B are designed primarily to reflect light primarily toward the first portion of at least one other light extractor, such as the first portion of a neighboring light extractor, for light extraction primarily along emitting direction 180. For example, second portion 121B reflects an incident light ray 140 as a reflected light ray 141 and first portion 122A extracts reflected light ray 141 as an extracted light ray 142 propagating along emitting direction 180, and second portion 123B reflects an incident light ray 150 as a reflected light ray 151 and first portion 122A extracts reflected light ray 151 as an extracted light ray 152 propagating along emitting direction 180.

In some cases, at least one of the first and second portions of a light extracting microstructure can be designed to have a secondary function. For example, in some cases, at least some of the first and/or second portions can be designed to secondarily redirect light to other areas of the lightguide, for example, to improve uniformity of the extracted light. In such cases, however, the primary function of the first portions is to extract light and the primary function of the second portions is to reflect light toward one or more other first portions, such as first portions of neighboring light extractors, for light extraction.

In general, the first portions and the second portions of a light extractor can have any shape that may be desirable in an application. For example, in some cases, the first and second portions can be or include one or more planar facets, piecewise planar facets, curved facets, or piecewise curved facets, or any combination of such facets. For example, FIG. 2A is a schematic view of a planar portion 210 that lies in a plane 215 that is normal to the xy-plane. In some cases, planar portion 210 that can be the first or second portion, or a part or segment of the first or second portion, of a light extractor. Planar portion 210 can have any shape that may be desirable in an application. For example, planar portion 210 can be in the shape of a two-dimensional rectilinear figure such as a polygon, such as a pentagon or a tetragon. For example, in some cases, planar portion 210 can be a trapezium, a trapezoid, a parallelogram, a rhombus, a rectangle, a deltoid, or a square.

As another example, FIG. 2B is a schematic view of a tilted planar portion 220 that lies in a plane 225 that makes an angle 227 with the xy-plane, where angle 227 is different, such as smaller, than 90 degrees. In some cases, tilted planar portion 220 can be the first or second portion, or a part or segment of the first or second portion, of a light extractor.

In some cases, planar portion 210 can be a two-dimensional, or a portion of, a curvilinear figure, such as a circle, an ellipse, or a parabola. As an example, FIG. 2C is a schematic view of a planar portion 230 that lies in a plane 235 that makes an angle 237 with the xy-plane, where angle 227 can be smaller than 90 degrees, 90 degrees, or greater than 90 degrees. Planar portion 230 can be a circular segment or a parabolic segment.

Figure 3A:
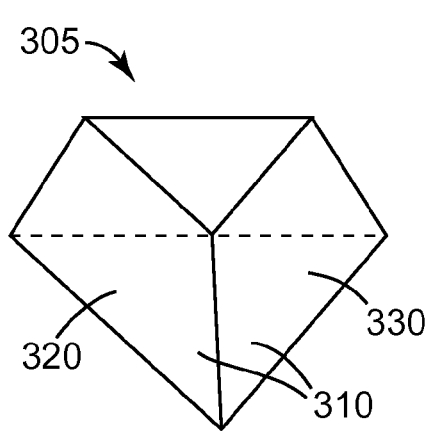
FIGS. 3A and 3B are schematic three-dimensional views of different light extractors.
Figure 3B:
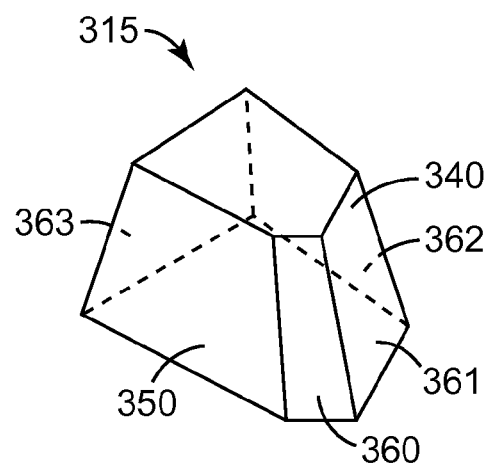

In some cases, the first and/or second portions can be or include a three-dimensional rectilinear body, such as a tetrahedron, a prism, or a pyramid, or a portion, or a combination, of such bodies, such as a frustum. For example, FIG. 3A is a schematic three-dimensional view of a light extractor 305 that includes a portion 310. Portion 310 includes planar segments 320 and 330. Portion 310 can be the first or second portion, or a part or segment of the first or second portion, of a light extractor. As another example, FIG. 3B is a schematic three-dimensional view of a light extractor 315 that includes a piecewise planar first portion 340 and a planar second portion 350. First portion 340 includes planar segments 360, 361, 362 and 363.

Figure 4A:
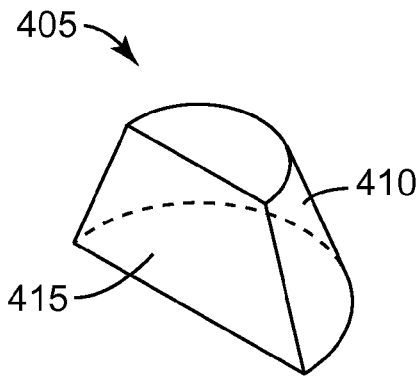
FIGS. 4A-4D are schematic three-dimensional views of different light extractors.
Figure 4B:
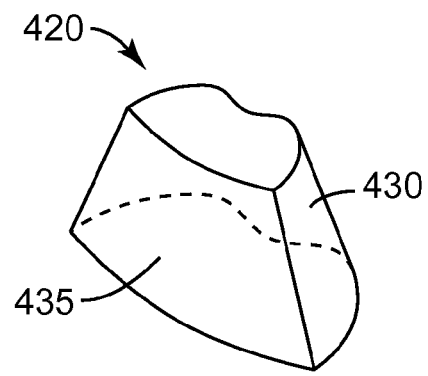
Figure 4C:
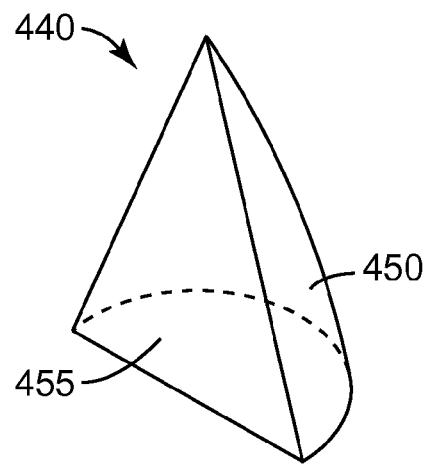
Figure 4D:
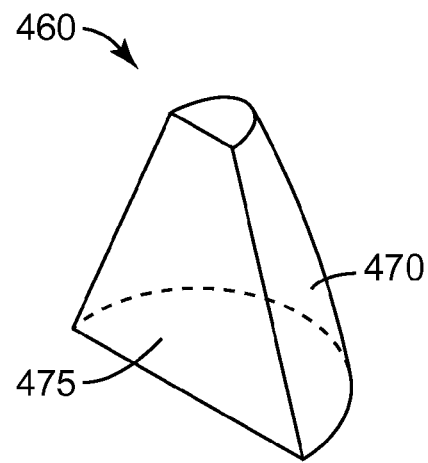

In some cases, the first and/or second portions can be or include a three-dimensional curvilinear body, such as a segment of a sphere, an asphere, an ellipsoid, a spheroid, a paraboloid, a cone, or a cylinder. As an example, FIG. 4A is a schematic three-dimensional view of a light extractor 405 that includes a curved first portion 410 and a planar second portion 415. First portion 410 can, for example, be a segment of a cylinder or a cone. As another example, FIG. 4B is a schematic three-dimensional view of a light extractor 420 that includes a curved first portion 430 and a curved second portion 435. Second portion 435 can, for example, be a segment of a cylinder or a sphere. As yet another example, FIG. 4C is a schematic three-dimensional view of a light extractor 440 that includes a curved first portion 450 and a planar second portion 455. In some cases, first portion 450 is a segment of an asphere and, as a result, has an aspherical facet. As another example, FIG. 4D is a schematic three-dimensional view of a light extractor 460 that is a truncated version of light extractor 440 and includes an aspheric first portion 470 and a planar second portion 475.

Figure 5:
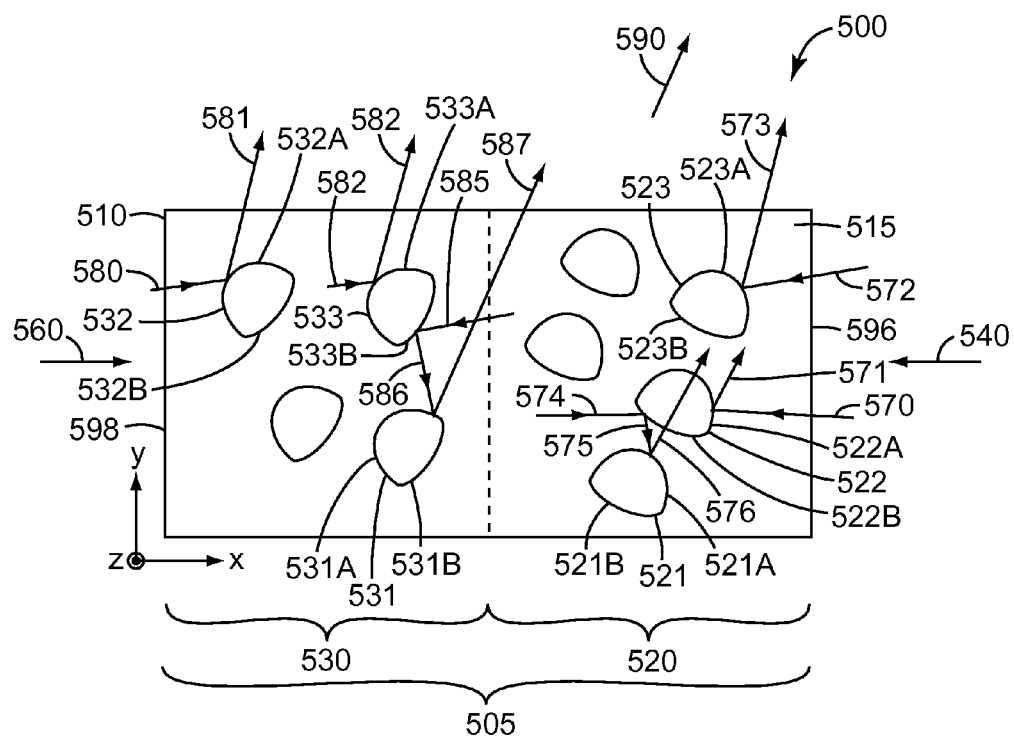
FIG. 5 is a schematic top-view of a lightguide.

FIG. 5 is a schematic top-view of a lightguide 500 that is generally disposed in, or generally defines, an xy-plane, although in some cases, lightguide 500 can be a non-planar lightguide, such as a curved lightguide. Lightguide 500 receives light from one or more lamps (not shown expressly in FIG. 5) and emits the received light from an emitting surface 515 of the lightguide. Lightguide 500 includes a plurality of light extractors 505.

Each light extractor includes a first portion that is designed primarily to extract light from the lightguide and a second portion that is designed primarily to reflect light primarily toward the first portion of at least one other light extractor, such as at least one neighboring light extractor, for light extraction.

Plurality of light extractors 505 includes a first plurality of light extractors 520 and a second plurality of light extractors 530. The first portions of light extractors 520 face a first edge 596 of the lightguide and the second portions of light extractors 520 face away from the first edge. In some cases, the second portions of light extractors 520 face a second edge 598 of the lightguide. The first portions of light extractors 530 face second edge 598 of the lightguide and the second portions of light extractors 530 face away from the second edge. In some cases, the second portions of light extractors 530 face first edge 596 of the lightguide.

For example, light extractor 521 includes a first portion 521A that faces first edge 596 and a second portion 521B that faces away from the first edge (for example, the second portion faces second edge 598), light extractor 522 includes a first portion 522A that faces first edge 596 and a second portion 522B that faces away from the first edge (for example, the second portion faces second edge 598), and light extractor 523 includes a first portion 523A that faces first edge 596 and a second portion 523B that faces away from the first edge (for example, the second portion faces second edge 598).

As another example, light extractor 531 includes a first portion 531A that faces second edge 598 and a second portion 531B that faces away from the second edge (for example, the second portion faces first edge 596), light extractor 532 includes a first portion 532A that faces second edge 598 and a second portion 532B that faces away from the second edge (for example, the second portion faces first edge 596), and light extractor 533 includes a first portion 533A that faces second edge 598 and a second portion 533B that faces away from the second edge (for example, the second portion faces first edge 596).

The first portions of first plurality of light extractors 520 are designed primarily to extract light that propagates within the lightguide along a general first direction 540 (along the −x direction). For example, first portion 522A extracts incident light ray 570 propagating along general direction 540 as extracted light ray 571 propagating along direction 590, and first portion 523A extracts incident light ray 572 propagating along general direction 540 as extracted light ray 573 propagating along direction 590. The second portions of first plurality of light extractors 520 are designed primarily to reflect incident light rays that propagate along a general second direction 560 primarily toward the first portion of at least one other light extractor, such as the first portion of a neighboring light extractor, for light extraction. For example, second portion 522B reflects an incident light ray 574 that propagates along general second direction 560 as a reflected light ray 575 and first portion 521A extracts reflected light ray 575 as an extracted light ray 576 propagating along emitting direction 590.

The first portions of second plurality of light extractors 530 are designed primarily to extract light that propagates within the lightguide along general second direction 560 (along the +x direction). For example, first portion 532A extracts incident light ray 580 propagating along general direction 560 as extracted light ray 581 propagating along direction 590, and first portion 533A extracts incident light ray 582 propagating along general direction 560 as extracted light ray 583 propagating along direction 590. The second portions of second plurality of light extractors 530 are designed primarily to reflect incident light rays that generally propagate along first direction 540 primarily toward the first portion of at least one other light extractor, such as the first portion of a neighboring light extractor, for light extraction. For example, second portion 533B reflects an incident light ray 585 that propagates along general first direction 540 as a reflected light ray 586 and first portion 531A extracts reflected light ray 586 as an extracted light ray 587 propagating along emitting direction 590.

Lightguide 500 includes a plurality of light extractors 520, such as light extractors 521 and 522. Each light extractor in this plurality of light extractors is designed primarily to extract light that propagates within the lightguide and is incident on the light extractor from a general first direction 540. For example, light extractor 522 extracts light 570 that propagates within the lightguide and is incident on light extractor 522 generally from first direction 540. The light extractors in plurality of light extractors 520 are also designed primarily to reflect light that propagates within the lightguide and is incident on the light extractor from a general second direction 560 that is different than first direction 540, toward another light extractor, where the other light extractor extracts the reflected light from the lightguide. For example, light extractor 522 reflects light 574 that propagates within the lightguide and is incident on the light extractor from a general second direction 560 that is different from direction 540, toward light extractor 521 as reflected light ray 575, where light extractor 521 extracts reflected light 575 from the lightguide as extracted light ray 576. First direction 540 defines a general direction along which a plurality of light rays travel within the lightguide. A light ray propagates generally along direction 540 if the light ray propagates along a direction that makes an angle ω with first direction 540, where the magnitude of angle ω is less than about 30 degrees, or less than about 25 degrees, or less than about 20 degrees, or less than about 15 degrees, or less than about 10 degrees.

In some cases, second direction 560 is opposite first direction 540. For example, in such cases, first direction 540 is along the −x direction and second direction 560 is along the +x direction.

Figure 6:
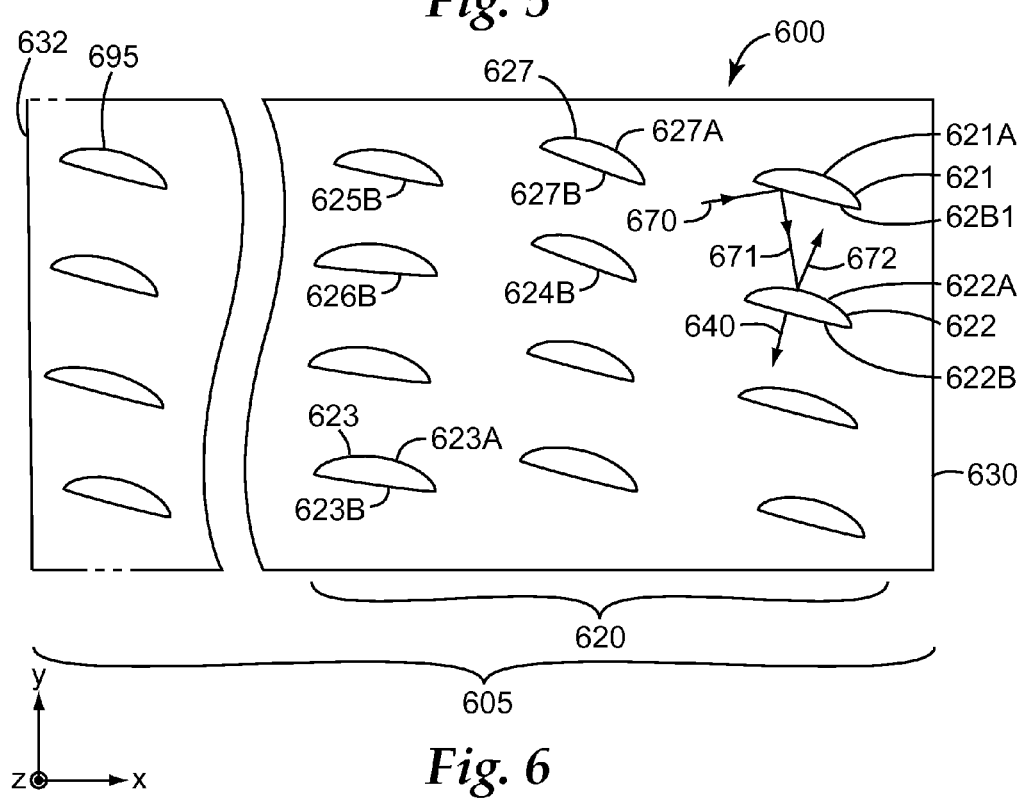
FIG. 6 is a schematic top-view of another lightguide.

FIG. 6 is a schematic top-view of a lightguide 600 that is generally disposed in, or generally defines, an xy-plane, although in some cases, lightguide 600 can be a non-planar lightguide, such as a curved lightguide. Lightguide 600 includes a plurality of light extractors 605. Each light extractor includes a first portion that is designed primarily to extract light from the lightguide and a second portion that is designed primarily to reflect light primarily toward the first portion of at least one other light extractor, such as the first portion of a neighboring light extractor, for light extraction. Plurality of light extractors 605 includes a first plurality of light extractors 620 that are disposed proximate a first edge 630. For example, in such cases, the light extractors in first plurality of light extractors 620 are closer to first edge 630 than an opposing second edge 632. In general, plurality of light extractors 605 can include other light extractors, such as a light extractor 695, that are too far from first edge 630 to be considered disposed proximate to the first edge. For example, in such cases, light extractor 695 is closer to second edge 632 than first edge 630.

Each light extractor in first plurality of light extractors 620 includes a first portion that is designed primarily to extract light from the lightguide and a planar second portion that is designed primarily to reflect light primarily toward the first portion of at least one other light extractor, such as the first portion of a neighboring light extractor, for light extraction. For example, light extractor 621 includes a first portion 621A and a planar second portion 621B, where the second portion is designed primarily to reflect an incident light ray 670 toward a first portion 622A of a neighboring light extractor 622 as a reflected light ray 671 for extraction as an extracted light ray 672.

Each planar portion has an associated surface normal oriented in a direction that is perpendicular to the planar portion. For example, planar side or facet or second portion 622B of light extractor 622 has an associated surface normal 640 that is perpendicular to plane 622B. In some cases, the planar second portions or the planar sides of the light extractors in first plurality of light extractors 620 substantially have the same orientation. For example, in such cases, the variation in the directions of the surface normals of the planar sides of the light extractors in the first plurality of light extractors is not greater than about 25%, or not greater than about 20%, or not greater than about 15%, or not greater than about 10%, or not greater than about 5%. As another example, in such cases, the variation in the directions of the surface normals of the planar sides of the light extractors in the first plurality of light extractors is not greater than about 20 degrees, or not greater than about 15 degrees, or not greater than about 10 degrees, or not greater than about 7 degrees, or not greater than about 5 degrees.

In some cases, the planar side of each light extractor in first plurality of light extractors 620 does not face the planar side of any neighboring light extractor in first plurality of light extractors 620. For example, light extractor 627 has a planar second portion 627B that does not face planar sides 621B, 622B, 624B, 625B and 627B which belong to the light extractors that are neighbors to light extractor 627 in first plurality of light extractors 620. In some cases, the planar side of each light extractor in first plurality of light extractors 620 does not face the planar side of any other light extractor in first plurality of light extractors 620. For example, planar side 621B does not face the planar side of any other light extractor in first plurality of light extractors 620.

In some cases, the first portion of each light extractor in plurality of light extractors 620 is non-planar resulting in each light extractor having a planar side (second portion) and a non-planar side (first portion) disposed opposite to the planar side. For example, light extractor 621 includes first portion or non-planar side 621A disposed opposite planar side 621B, light extractor 622 includes first portion or non-planar side 622A disposed opposite planar side 622B, light extractor 623 includes a first portion or non-planar side 623A disposed opposite planar side 623B, and light extractor 627 includes a first portion or non-planar side 627A disposed opposite planar side 627B. The non-planar sides of the light extractors in first plurality of light extractors 620 are designed primarily to extract light from the lightguide, and the planar sides of the light extractors in first plurality of light extractors 620 are designed primarily to reflect light toward the non-planar portions of other light extractors in first plurality of light extractors 620 for light extraction.

The light extractors disclosed herein include first portions that are designed primarily to extract light and second portions that are designed primarily to reflect light primarily toward the first portions of one or more other light extractors, such as the first portion of a neighboring light extractor, for light extraction. In some cases, the light extractors can have additional portions, such as third portions, that are not primarily designed to either extract light or reflect light toward the first portions of other light extractors for extraction. In such cases, the additional portions can be primarily designed to perform other functions. For example, the additional portions can be primarily designed to redirect light to other portions of the lightguide. For example, the additional portions can be designed primarily to redirect light to one or more light deficient areas of the lightguide to improve brightness uniformity of the extracted light. As another example, the additional portions may improve processing conditions and may have no, or very little, optical function. In some cases, the additional portions may not contribute, or contribute very little, to light extractions.

Figure 7:
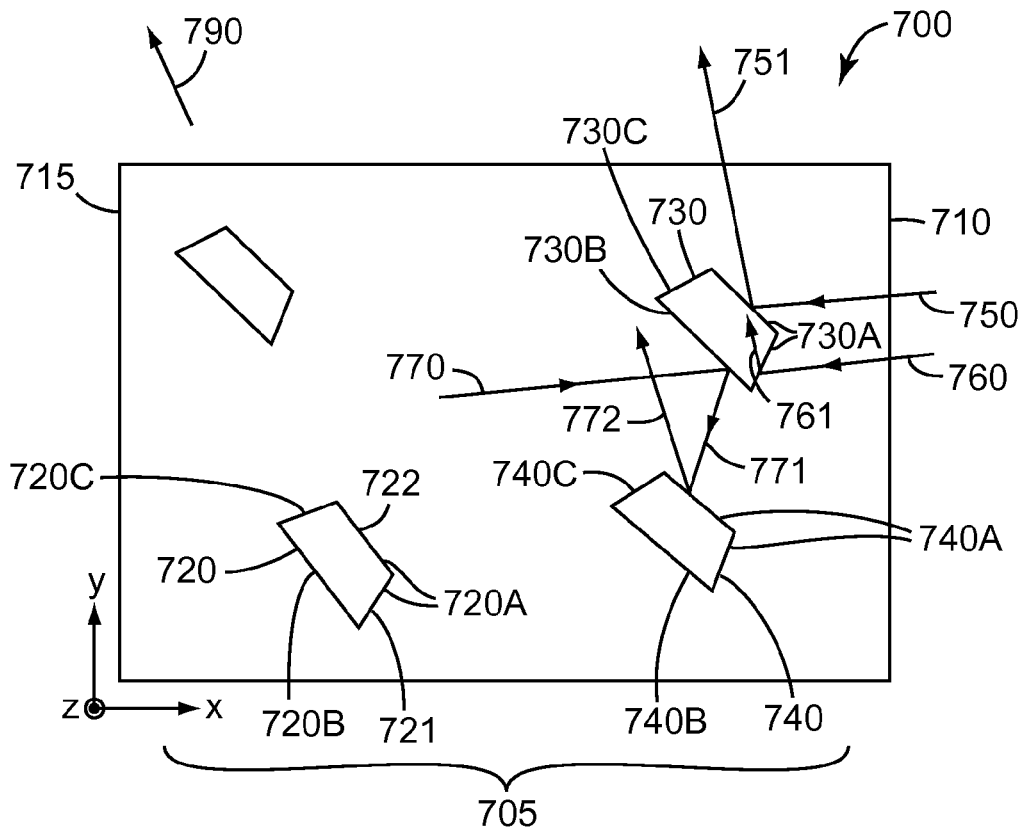
FIG. 7 a schematic top-view of another lightguide.

For example, FIG. 7 is a schematic top-view of a lightguide 700 that is generally disposed in, or generally defines, an xy-plane, although in some cases, lightguide 700 can be a non-planar lightguide, such as a curved lightguide. Lightguide 700 receives light from one or more lamps (not shown expressly in FIG. 7) and emits the received light from an emitting surface 715 of the lightguide along a general emitting direction 790. Lightguide 700 includes a plurality of light extractors 705. Each light extractor includes a first portion that is designed primarily to extract light from the lightguide, a second portion that is designed primarily to reflect light primarily toward the first portion of at least one other light extractor for light extraction, and a third portion. For example, light extractor 720 includes a non-planar first portion 720A, a planar second portion 720B, and a planar third portion 720C; light extractor 730 includes a non-planar first portion 730A, a planar second portion 730B, and a planar third portion 730C; and light extractor 740 includes a non-planar first portion 740A, a planar second portion 740B, and a planar third portion 740C. In the exemplary lightguide 700, each non-planar first portion of a light extractor is a piecewise planar portion and includes two planar segments. For example, non-planar first portion 720A includes first planar segment 721 and second planar segment 722.

Figure 8A:
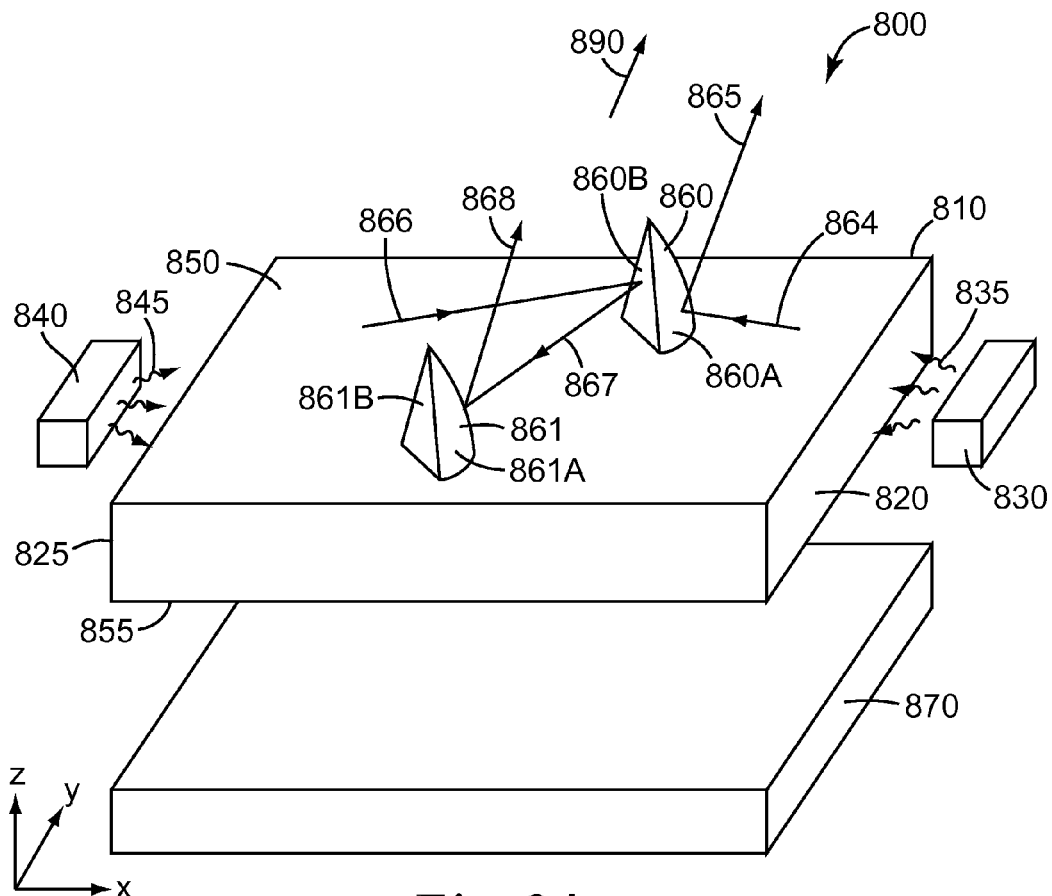
FIGS. 8A and 8B are respective schematic three-dimensional and side-views of a light source.
Figure 8B:
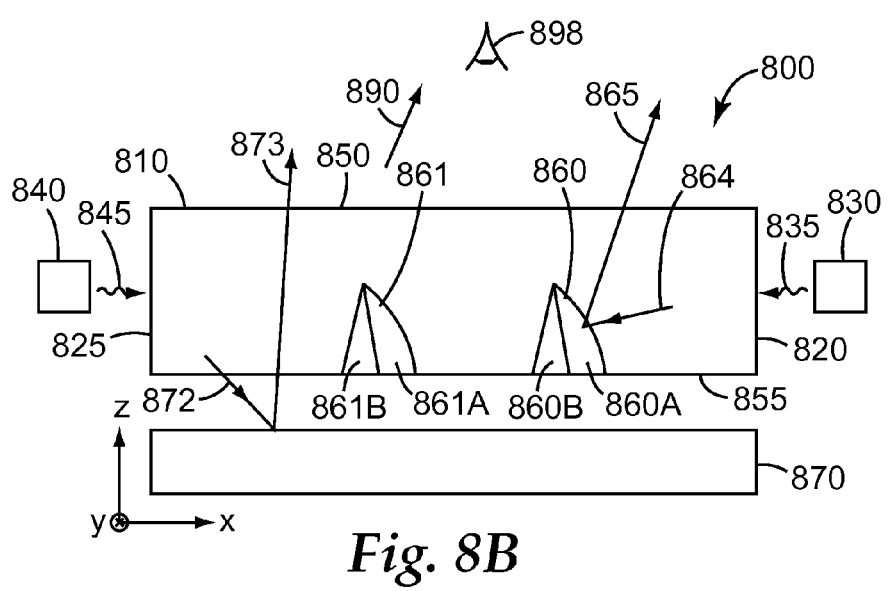

FIGS. 8A and 8B are schematic respective three-dimensional- and side-views of a light source 800 that includes a lightguide 810 disposed on a back reflector 870, a first lamp 830 disposed along a first edge 820 of the lightguide, and a second lamp 840 disposed along an opposing second edge 825 of the lightguide. Lightguide 810 is generally disposed in, or generally defines, an xy-plane, although in some cases, lightguide 810 can be a non-planar lightguide, such as a curved lightguide. Lightguide 810 includes a top emitting major surface 850 and an opposite structured bottom major surface 855 that faces and is disposed proximate to back reflector 870.

Lamp 830 emits light 835 that enters the lightguide through first edge 820 and lamp 840 emits light 845 that enters the lightguide through second edge 825. Lightguide 810 receives light from lamps 830 and 840 and emits the received light from emitting surface 850 generally along an emitting direction 890. Structured bottom surface 855 includes a plurality of light extractors 805, such as light extractors 860 and 861, for extracting light that enters the lightguide from the lamps. Each light extractor includes a first portion that is designed primarily to extract light from the lightguide primarily along emitting direction 890 that is not in the xy-plane, and a second portion that is designed primarily to reflect light primarily toward the first portion of at least one other light extractor, such as the first portion of a neighboring light extractor, for light extraction primarily along the emitting direction. For example, light extractor 860 includes a first portion 860A and a second portion 860B, and light extractor 861 includes a first portion 861A and a second portion 861B. First portions 860A and 861A are designed primarily to extract light from the lightguide primarily along emitting direction 890. For example, first portion 860A extracts an incident light ray 864 as an extracted light ray 865 propagating along emitting direction 890. Second portions 860B and 861B are designed primarily to reflect light primarily toward the first portion of at least one other light extractor for light extraction primarily along emitting direction 890. For example, second portion 860B reflects an incident light ray 866 as a reflected light ray 867 and first portion 861A extracts reflected light ray 867 as an extracted light ray 868 propagating along emitting direction 890.

Figure 9:
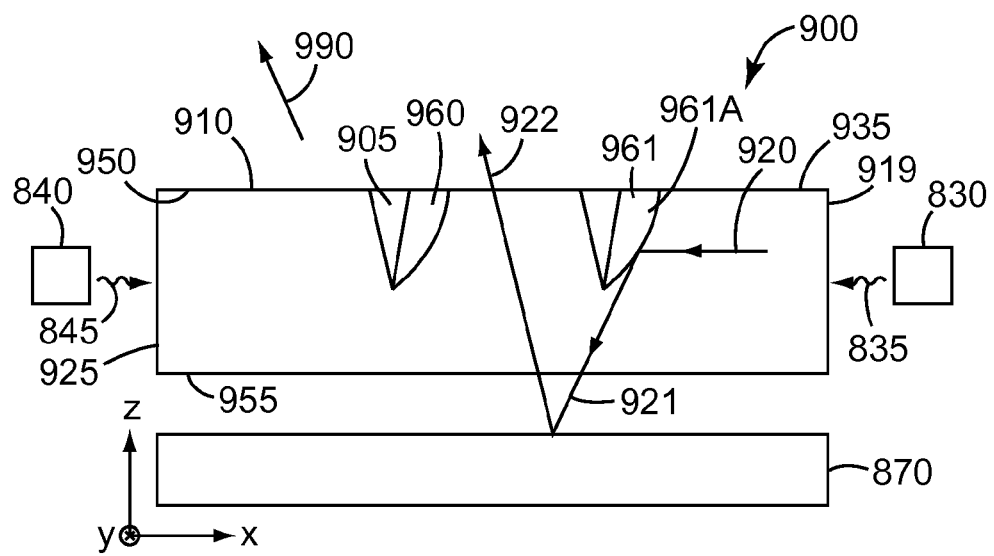
FIG. 9 is a schematic side-view of another light source.

In the exemplary light source 800, the plurality of light extractors 805 are part of bottom major surface 855. In general, the light extractors can be any where within the lightguide that may be desirable in an application. For example, the light extractors can be part of top emitting surface 850. For example, FIG. 9 is a schematic side-view of a light source 900 that includes a lightguide 910 disposed on back reflector 870, first lamp 830 disposed along a first edge 919 of the lightguide, and second lamp 840 disposed along a second edge 925 of the lightguide. Lightguide 910 includes a top structured major surface 950 and an opposite emitting bottom major surface 955 that faces and is disposed proximate to back reflector 870. Lamp 830 emits light 835 that enters the lightguide through first edge 919 and lamp 840 emits light 845 that enters the lightguide through second edge 925. Lightguide 910 receives light from lamps 830 and 840 and emits the received light from bottom emitting surface 955 toward back reflector 870. The back reflector reflects the emitted light generally along an emitting direction 990. In some cases, light ray 922 can encounter a light extractor, in which case, the light ray can be redirected in a direction other than emitting direction 990. As a result, in some cases, the output light can have a broader angular distribution than a lightguide where the light extractors are part of the bottom surface.

Structured top surface 950 includes a plurality of light extractors 905, such as light extractors 960 and 961, for extracting light that enters the lightguide from the lamps. Each light extractor includes a first portion that is designed primarily to extract light from the lightguide and a second portion that is designed primarily to reflect light primarily toward the first portion of at least one other light extractor, such as the first portion of a neighboring light extractor, for light extraction. For example, light extractor 961 includes a first portion 961A that extracts an incident light ray 920 as an extracted light ray 921 and back reflector 870 reflects light ray 921 as a light ray 922 emitted by an emitting surface 935 of light source 900 along emitting direction 990. In the exemplary light source 900, the light source emitting surface 935 overlaps top surface 950 of the lightguide.

Referring back to FIGS. 8A and 8B, back reflector 870 reflects light towards the general +z-direction toward, for example, a viewer 899. For example, an incident light ray 872 that exits the lightguide from bottom major surface 855 of the lightguide is reflected back as an exiting light ray 873 generally propagating toward viewer 898. Back reflector 870 can be any type reflector that may be desirable and/or practical in an application. For example, the back reflector can be a specular reflector, a semi-specular or semi-diffuse reflector, or a diffuse reflector, such as those disclosed in International Patent Application No. PCT/US 2008/064115, filed May 19, 2008, claiming priority from Provisional U.S. Patent Application No. 60/939085, filed May 20, 2007, both incorporated herein by reference in their entirety. For example, the reflector can be an aluminized film or a multi-layer polymeric reflective film, such as an enhanced specular reflector (ESR) film (available from 3M Company, St. Paul, Minn.). As another example, back reflector 870 can be a diffuse reflector having a white appearance. As yet another example, back reflector 870 can be a substantially specular reflector with a slightly matte surface to prevent the occurrence of wet-out when the back reflector comes into physical contact with bottom surface 955.

Figure 10:
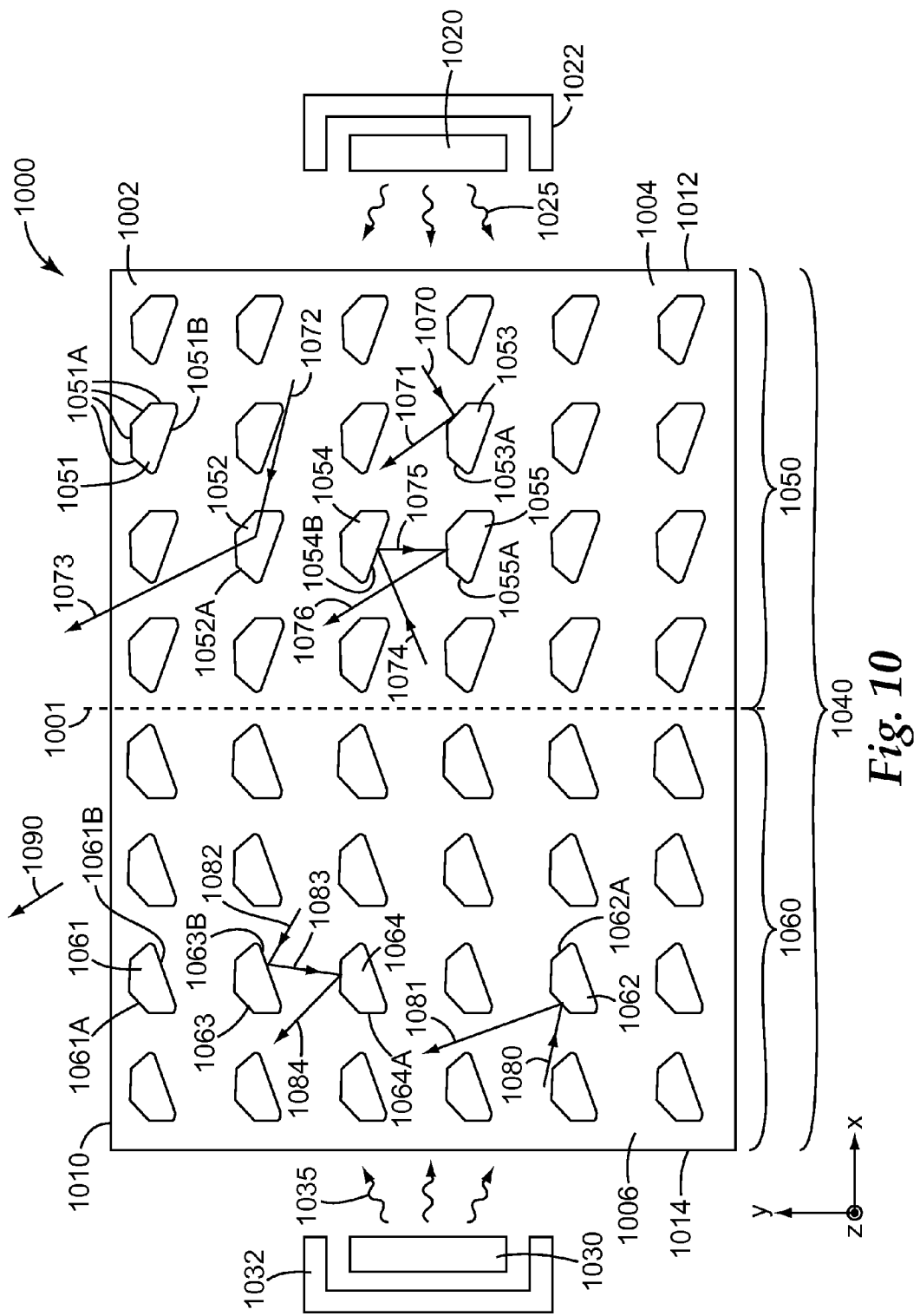
FIG. 10 is a schematic top-view of another light source.

FIG. 10 is a schematic top-view of a light source 1000 that has an emitting surface 1002 which emits light along a direction 1099 that is not in the xy-plane. Light source 1000 includes a lightguide 1010, a first lamp 1020 disposed along and near a first edge 1012 of the lightguide and housed in a first side reflector 1022, and a second lamp 1030 disposed along and near a second edge 1014 of the lightguide and housed in a second side reflector 1032, where the second edge is different than the first edge. First lamp 1020 emits light 1025 that enters the lightguide through first edge 1012 and propagates in the general −x direction. Second lamp 1030 emits light 1035 that enters the lightguide through second edge 1014 and propagates in the general +x direction which is different than the general direction along which emitted light 1025 propagates.

Lightguide 1010 includes a plurality of light extractors 1040, such as light extractors 1051 and 1061. Each light extractor includes a first portion that is designed primarily to extract light from the lightguide and a second portion that is designed primarily to reflect light toward another light extractor, such as a neighboring light extractor, for extraction from the lightguide. For example, light extractor 1051 includes a first portion 1051A and a second portion 1051B, and light extractor 1061 includes a first portion 1061A and a second portion 1061B, where each first portion, such as first portion 1051A, includes four segments.

The plurality of light extractors 1040 includes a first plurality of light extractors 1050 that covers a first emitting surface 1004 of emitting surface 1002, and a second plurality of light extractors 1060 that covers a different second emitting surface 1006 of emitting surface 1002. First plurality of light extractors 1050 is different than second plurality of light extractors 1060. In some cases, the two pluralities of light extractors commonly include one or more extractors, such as one or more extractors that, for example, do not include first and second portions. In some cases, the two pluralities of light extractors do not overlap, meaning that no light extractor in one plurality of light extractors is also included in the other plurality of light extractors. In some cases, respective first and second emitting areas 1004 and 1006 do not overlap. In some cases, each of emitting areas 1004 and 1006 includes an area that is also included in the other emitting area.

First plurality of light extractors 1050 extract light from the lightguide through first emitting area 1004 of emitting surface 1002. For example, first portion 1052A of light extractor 1052 extracts an incident light ray 1072 as an extracted light ray 1073 propagating along emitting direction 1099, and first portion 1053A of light extractor 1053 extracts an incident light ray 1070 as an extracted light ray 1071 propagating along emitting direction 1099. Second plurality of light extractors 1060 extract light from the lightguide through a second emitting area 1006 of emitting surface 1002, where area 1006 is different than area 1004. For example, first portion 1062A of light extractor 1062 extracts an incident light ray 1080 as an extracted light ray 1081 propagating along emitting direction 1099, although, in some cases, emitting surfaces 1004 and 1006 can emit light in different directions.

The first portions of the light extractors in first plurality of light extractors 1050 face first lamp 1020 and the second portions of the light extractors in the first plurality of light extractors face away from the first lamp (for example, the second portions face second lamp 1030). The second portions of first plurality of light extractors 1050 are designed primarily to reflect light 1035 that is emitted by second lamp 1030 toward the first portion of at least one other light extractor, such as the first portion of a neighboring light extractor, in the first plurality of light extractors for extraction from the lightguide. For example, second portion 1054B of light extractor 1054 is primarily designed to reflect an incident light ray 1074 that is emitted by second lamp 1030 toward first portion 1055A of light extractor 1055 as reflected light ray 1075, and first portion 1055A extracts reflected light ray 1075 as emitted light ray 1076 propagating along emitting direction 1099.

The first portions of the light extractors in second plurality of light extractors 1060 face second lamp 1030 and the second portions of the light extractors in the second plurality of light extractors face away from the second lamp (for example, the second portions face first lamp 1020). The second portions of second plurality of light extractors 1060 are designed primarily to reflect light 1025 that is emitted by first lamp 1020 toward the first portion of at least one other light extractor, such as the first portion of a neighboring light extractor, in the second plurality of light extractors for extraction from the lightguide. For example, second portion 1063B of light extractor 1063 is primarily designed to reflect an incident light ray 1082 that is emitted by first lamp 1020 toward first portion 1064A of light extractor 1064 as reflected light ray 1083, and first portion 1064A extracts reflected light ray 1083 as emitted light ray 1084 propagating along emitting direction 1099.

In the exemplary light source 1000, the first portions of the light extractors in respective first and second pluralities of the light extractors 1050 and 1060 extract light primarily along the same direction 1099. In general, first plurality of light extractors 1050 can extract light from lightguide 1010 along a first direction and second plurality of light extractors 1060 can extract light from lightguide 1010 along a second direction that is different than the first direction.

Figure 11:
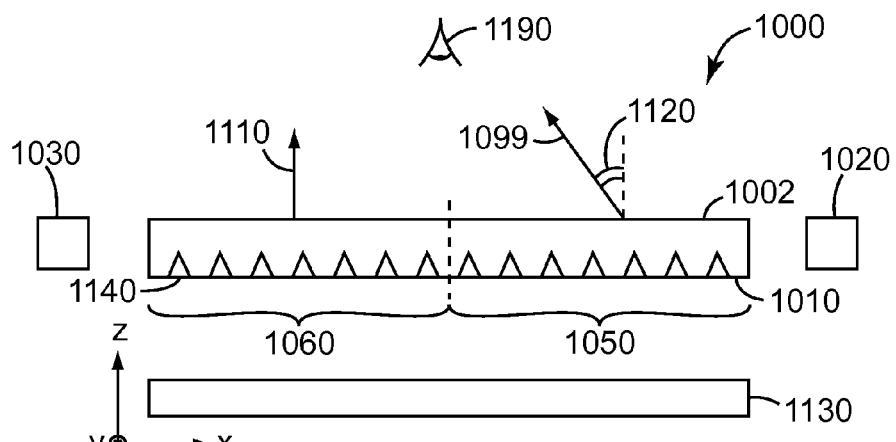
FIG. 11 is a schematic side-view of the light source illustrated in FIG. 10.

The exemplary lightguide 1010 is generally disposed in, or generally defines, an xy-plane and a surface normal that is along the z-direction. In some cases, emitting direction 1099 is different than the direction of the surface normal of the lightguide. For example, FIG. 11 is a schematic side-view of light source 1000 having emitting surface 1002 that emits light along emitting direction 1099. Lightguide 1010 has a surface normal 1110 that is along the z-axis and makes an angle 1120 with emitting direction 1099. In some cases, angle 1120 is close to zero degrees. For example, in such cases, angle 1120 is not greater than about 10 degrees, or not greater than about 7 degrees, or not greater than about 5 degrees, or not greater than about 3 degrees. In some cases, angle 1120 can be in a range from about 10 degrees to about 50 degrees, or from about 15 degrees to about 40 degrees, or from about 15 degrees to about 30 degrees, or from about 15 degrees to about 25 degrees.

In some cases and as illustrated in FIG. 11, light source 1000 includes a back reflector 1130 for reflecting light that exits the lightguide from a bottom major surface 1140 of the lightguide toward the general direction of a viewer 1190. Back reflector 1130 can be similar to any back reflector disclosed herein, such as back reflector 870.

Referring back to FIG. 10, in general, plurality of light extractors 1040 may or may not have an axis of symmetry. In some cases and as illustrated in FIG. 10, plurality of light extractors 1040 is generally symmetric about an axis of symmetry 1001, meaning that the light extractors in the two pluralities are approximately mirror images of one another about axis 1001. In some cases, axis of symmetry 1001 separates first plurality of light extractors 1050 from second plurality of light extractors 1060.

Lightguide 1010 can be made of any material that may be desirable in an application. Exemplary materials include polycarbonates, polyacrylates such as polymethyl methacrylate and urethane acrylates, polystyrenes, silicones, and polyethylene terepthalate glycol (PETG). Lightguide 1010 can have any index of refraction that may be desirable in an application. In some cases, the index of refraction of the lightguide is in a range from about 1.3 to about 1.8, or from about 1.35 to about 1.75, or from about 1.38 to about 1.7.

In the exemplary light source 1000, the light extractors in first plurality of light extractors 1050 are located in a first region that defines the first emitting area 1004 and the light extractors in second plurality of light extractors 1060 are located in a neighboring second region that defines the second emitting area 1006. In general, the light extractors in the first and second two pluralities of light extractors can be located and arranged in emitting surface 1002 in any manner or form that may be desirable in an application. For example, the light extractors can form an alternating pattern.

Figure 19:
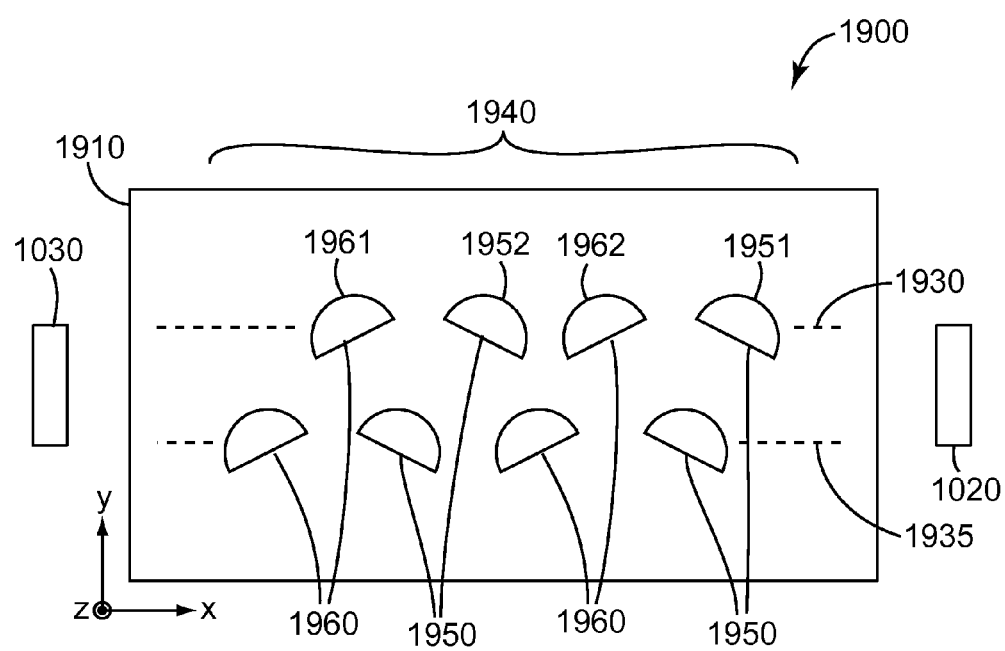
FIG. 19 is a schematic top-view of a light source.

For example, FIG. 19 is a schematic top-view of a light source 1900 that includes a lightguide 1910, first lamp 1020, and second lamp 1030. Lightguide 1910 includes a plurality of light extractors 1940 that form a plurality of rows, such as rows 1930 and 1935. Each light extractor includes a first portion that is designed primarily to extract light from the lightguide and a second portion that is designed primarily to reflect light toward another light extractor, such as the first portion of a neighboring light extractor, for extraction from the lightguide. The plurality of light extractors 1940 includes a first plurality of light extractors 1950 and a second plurality of light extractors 1060 that is different than first plurality of light extractors 1950. Each row in plurality of light extractors 1940 includes a number of light extractors from the first plurality of light extractors and a number of light extractors from the second plurality of light extractors. In each row, a light extractor from one plurality of light extractors is next, on either side, to a light extractor from the other plurality of light extractors. For example, in row 1930, light extractor 1962 neighbors light extractor 1951 on one side and light extractor 1952 on the other side.

Figure 12:
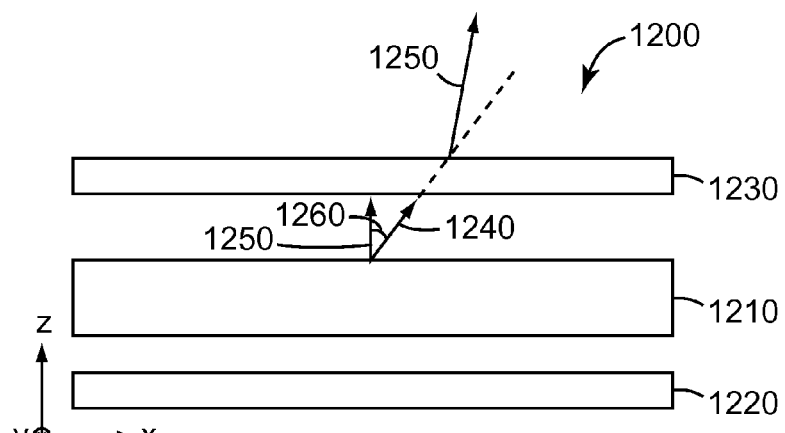
FIG. 12 is a schematic side-view of a light source assembly.

FIG. 12 is a schematic side-view of a light source assembly that includes a light source 1210 disposed between a back reflector 1220 and a light management film 1230. Light source 1210 can be or include any light source disclosed herein, and can include any lightguide disclosed herein. For example, light source 1210 can be similar to light source 1000. As another example, light source 1210 can include a lightguide that is similar to lightguide 1010.

Figure 13A:
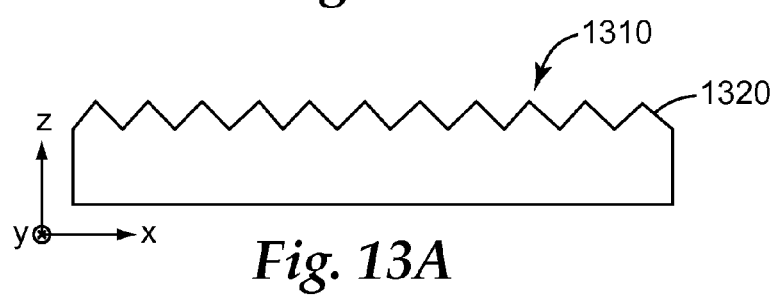
FIGS. 13A and 13B are schematic side-views of various light management films.

Light source 1210 is generally disposed in, or generally defines, an xy-plane and a surface normal 1250 that is along the z-direction. Light source 12 emits light in a general direction 1240 that makes an angle 1260 with surface normal 1250. Light management film 1230 alters at least one optical property of light that is emitted by light source 1210. For example, light management film 1230 can be or include a prismatic film for changing the direction of light propagation from, for example, direction 1240 to direction 1250. For example, light management film 1230 can be or include a prismatic film 1310 having symmetric prisms 1320, a schematic side-view of which is illustrated in FIG. 13A. In some cases, prisms 1320 can face back reflector 1220. In some cases, prisms 1320 can face away from back reflector 1220. In some cases, prisms 1320 can be linear symmetric prisms extending, for example, along the y-direction.

Figure 13B:
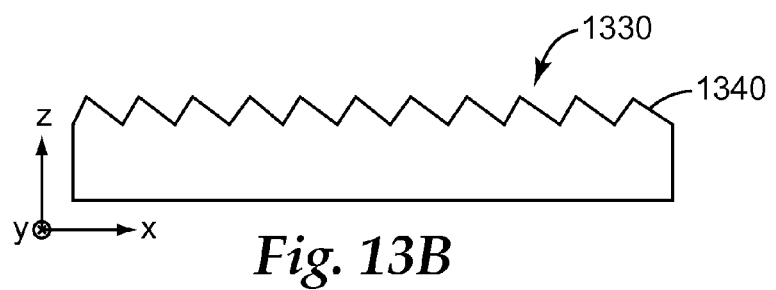

As another example, light management film 1230 can be or include a prismatic film 1330 having asymmetric prisms 1340, a schematic side-view of which is illustrated in FIG. 13B. In some cases, prisms 1340 can face back reflector 1220. In some cases, prisms 1340 can face away from back reflector 1220. In some cases, prisms 1340 can be linear asymmetric prisms extending, for example, along the y-direction. In some cases, light extracted from the lightguide is substantially perpendicular to the plane of the lightguide. In such cases, a light management film for redirecting the output light may not be necessary, although other light management films such as a reflective polarizer may still be included.

In some cases, light management film 1230 be or include one or more light absorbing polarizers, light reflecting polarizers, optical diffusers, optical retarders, and/or optical filters.

Referring back to FIG. 10, lamps 1020 and 1030 can be any type lamp that may be desirable in an application. For example, the lamps can be cold cathode fluorescent lamps (CCFLs), light emitting diodes (LEDs), lasers, hot cathode fluorescent lamps (HCFLs), external electrode fluorescent lamps (EEFLs), electroluminescent lamps (ELs), organic electroluminescent lamps (OLEDs), or any other lamp that be suitable in an application. Lamps 1020 and 1030 can be any shape lamps such as, for example, point source lamps or linear lamps. The lamps may emit light having any wavelength or wavelength range. For example, the emission wavelength may be in the UV, visible, or infrared range. In some cases, the lamps can emit white light. In such cases, output light 1099 can be substantially white since light extraction is primarily based on reflection, and not refraction, of light.

Some of the advantages of the disclosed constructions such as lightguides and light sources, are further illustrated by the following examples. The particular materials, parameters, amounts, dimensions, and assumptions recited in these examples, as well as other conditions and details, should not be construed to unduly limit the present invention.

EXAMPLE 1

Figure 14A:
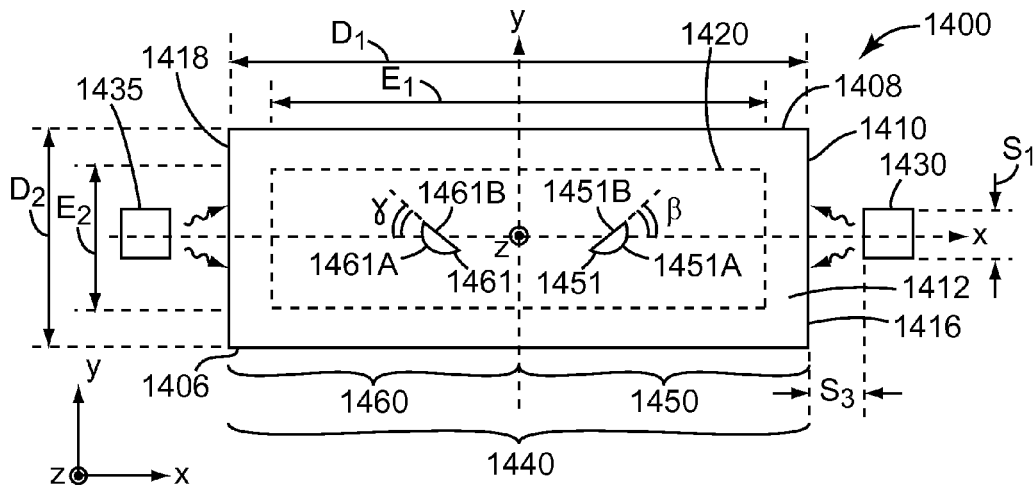
FIGS. 14A and 14B are respective schematic top- and side-views of a light source.
Figure 14B:
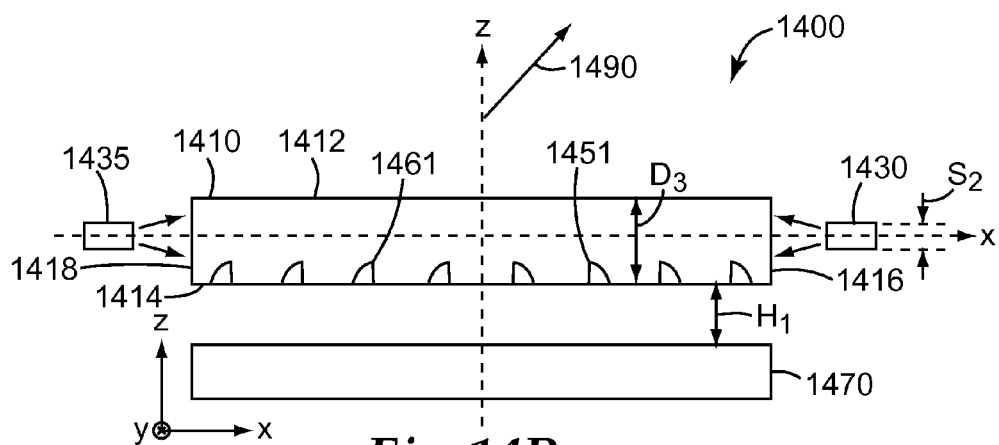
Figure 14C:
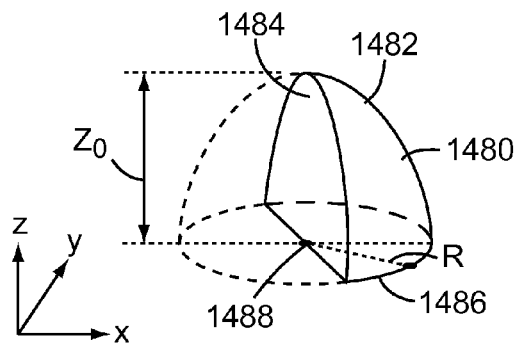
FIG. 14C is a schematic three-dimensional view of a light extractor.

A light source 1400, various views and portions of which are schematically illustrated in FIGS. 14A-14C, was numerically modeled using the ASAP program (available from Breault Research Organization, Inc., Tucson, Ariz.). Light source 1400 included a lightguide 1410 that was centered on the xyz-coordinate system and had a top major surface 1412 and an opposing structured bottom major surface 1414, a first lamp 1430 that faced a first edge 1416 of the lightguide, a second lamp 1435 that faced a second edge 1418 of the lightguide, and a back reflector 1470.

Lightguide 1410 had a length $D_1$ of 299.4 mm, a width $D_2$ of 28 mm, a thickness $D_3$ of 2 mm, and an index of refraction of 1.485 at 625 nm. The area covered by the light extractors was an extraction region 1420 which was the emission area of the light guide. Extraction region 1420 had a length $E_1$ of 279.4 mm and width $E_2$ of 25.4 mm. The emitting face of each of lamps 1430 and 1435 had a length $S_1$ of 1.85 mm and a width $S_2$ of 0.5 mm. The spacing $S_3$ between each lamp and the corresponding lightguide edge was 10 microns. The lamps emitted light at 625 nm. Light emitted by each lamp had a lambertian profile.

Back reflector 1470 was a specular reflector and had a reflectance of 95%. The spacing $H_1$ between the back reflector and the lightguide was 50 microns.

Bottom surface 1414 of the lightguide was structured and included a plurality of light extractors 1440 such as light extractors 1451 and 1461. Plurality of light extractors 1440 was symmetric about the yz-plane. In particular, plurality of light extractors 1440 included a first plurality of light extractors 1450, such as light extractor 1451, and a second plurality of light extractors 1460, such as light extractor 1461, where the first and second pluralities of light extractors were mirror images of each other about the yz-plane. For example, each light extractor in the first plurality of light extractors had a corresponding mirror image in the second plurality of light extractor about the yz-plane. For example, light extractor 1451 was the mirror image of light extractor 1461 about the yz-plane.

Each light extractor in light source 1400 included a first portion that was designed primarily to extract light from the lightguide and a second portion that was designed primarily to reflect light toward a neighboring light extractor for extraction from the lightguide. For example, light extractor 1451 included a first portion 1451A and a second portion 1451B, and light extractor 1461 included a first portion 1461A and a second portion 1461B.

FIG. 14C is a schematic three-dimensional view of an exemplary light extractor 1480 of light source 1400. Light extractor 1480 included a first portion 1482 and a second portion 1484. First portion 1482 was a half of an inverted paraboloid (or a circular paraboloid) described locally by the equation:

$$z = -a(x^2 + y^2) + z_0 \quad (1)$$

where $z_0$, the height of the extractor, was 1.5 mm and "a" was 1.335 mm$^{-1}$. Light extractor 1480 had a base 1486 that was a half-circle having a center 1488 and radius $R = \sqrt{z_0/a}$. Second portion 1484 of each light extractor was a vertical plane 1484 (perpendicular to the xy-plane) that divided the paraboloid into two equal halves and included center 1488 of base 1486. The second portion of each light extractor, such as second portion 1451B of light extractor 1451, in first plurality of light extractors 1450 made an angle $\beta = 25$ degrees with the x-axis, and the second portion of each light extractor, such as second portion 1461B of light extractor 1461, in second plurality of light extractors 1460 made an angle $\gamma = 25$ degrees with the x-axis.

In the exemplary light source 1400, the planar second portions of the light extractors in respective first and second pluralities of light extractors 1450 and 1460, such as planar second portions 1451B and 1461B, are neither parallel nor perpendicular to either first edge 1416 or second edge 1418 of the lightguide. Similarly, the planar second portions of the light extractors in respective first and second pluralities of light extractors 1450 and 1460, are neither parallel nor perpendicular to either a third edge 1406 or a fourth edge 1408 of the lightguide.

The light extractors in plurality of light extractors 1440 formed a two-dimensional regular array in the xy-plane with a plurality of rows along the x-direction and a plurality of columns along the y-direction. Each row and column had a pitch or period (the distance between corresponding points on neighboring light extractors) of 3.408 mm along the x-axis and 3.668 mm along the y-axis. Center 1488 of one of the light extractors had an x-coordinate of −128.003 mm and a y-coordinate of −11.004 mm.

The light extractors in each column had the same height. The size (including height and base radius) of the light extractors in a column depended on the location of the column. In particular, the size or dimensions of the light extractors in a column were scaled by a scaling or magnification factor exp (−|x|/201.5). For example, the height of each light extractor in the left most column (x=−139.7 mm) and the right most column (x=139.7 mm) was scaled by the scale factor 0.5, resulting in, for example, an extractor height of 0.75 mm in each of the two columns. In the exemplary light source 1400, the size of the extractors increased with increasing distance from the closest lamp, but all the extractors had the same shape.

Figure 15A:
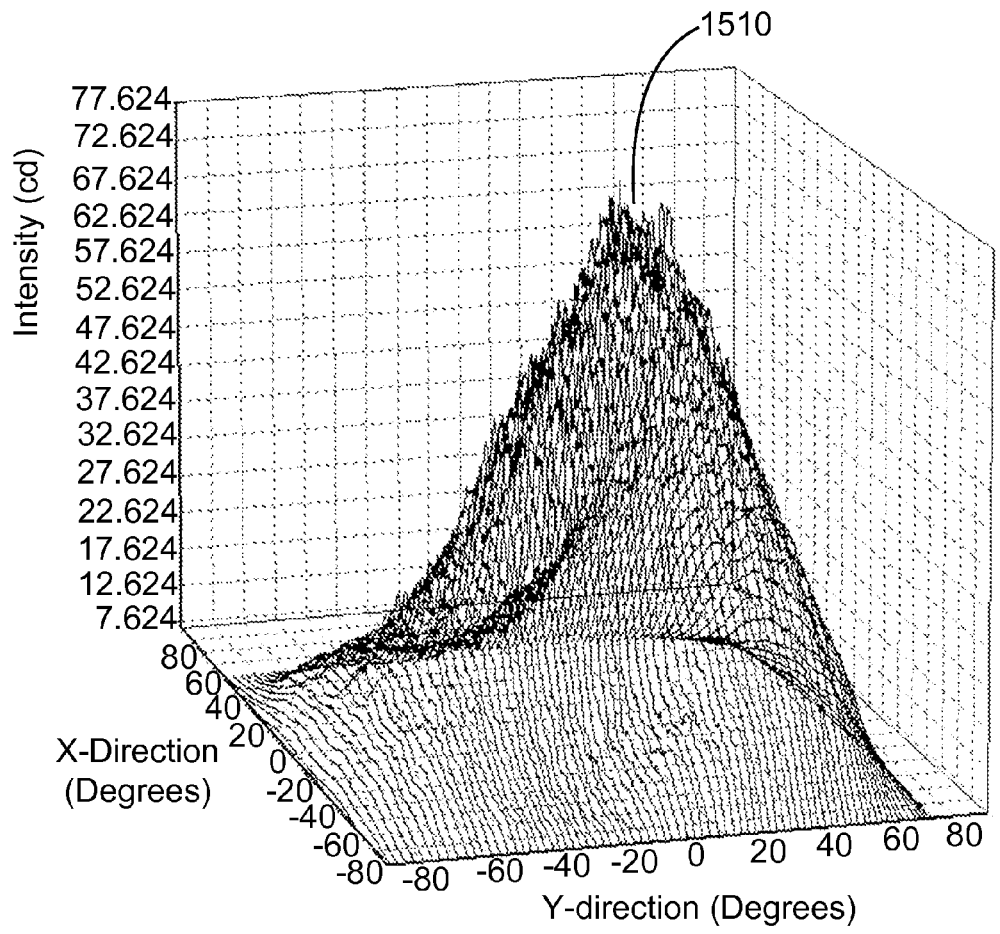
FIGS. 15A and 15B are respective intensity and intensity contour plots of the output of a light source.
Figure 15B:
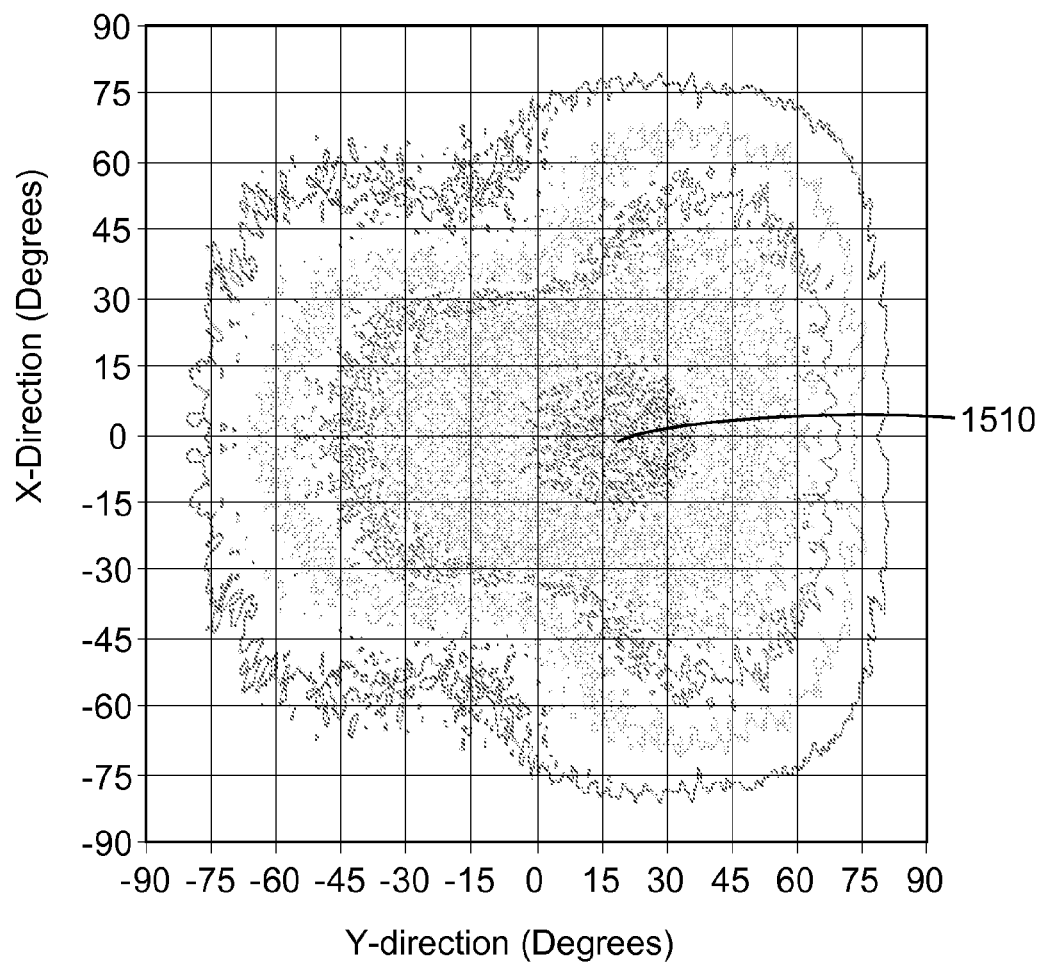

FIGS. 15A and 15B are respective intensity and intensity contour plots of output light 1490. The vertical axis in FIG. 15A is the extracted light intensity in candela. The output light had a peak 1510 at about 20 degrees from the z-axis. The light source had an overall extraction efficiency of about 46%.

EXAMPLE 2

Figure 16:
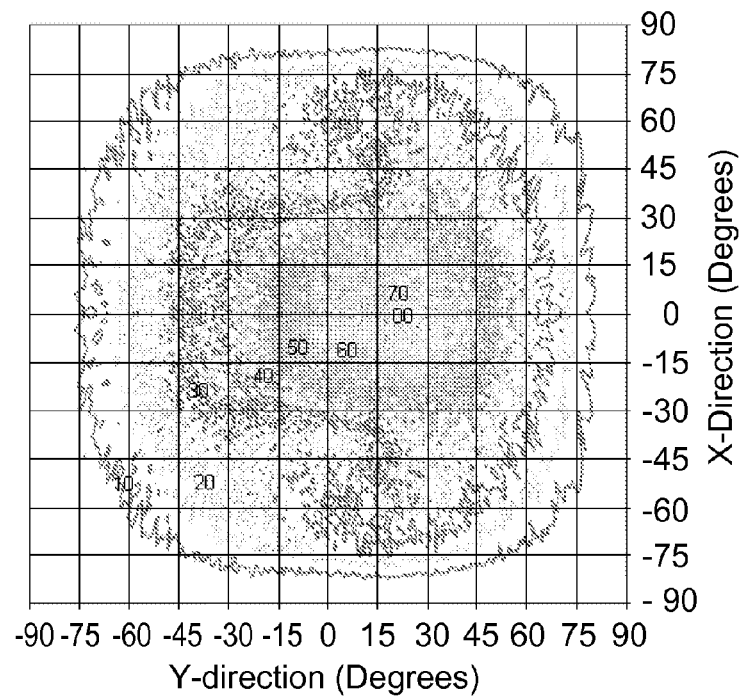
FIG. 16 is an intensity contour plot of the output of another light source.

A light source similar to light source 1400 in Example 1 was numerically modeled except that "a" was 14.3 mm$^{-1}$ in equation (1), $z_0$ was 0.143 mm, the rows and the columns in the array of plurality of light extractors 1440 had a pitch of 0.2574 mm along the x-axis and 0.2598 mm along the y-axis, the center 1488 of one of the light extractors was located at x=−129.572 mm and y=−12.611 mm, and the size of the light extractors were scaled by a scaling or magnification factor exp (−|x|/109.7). FIG. 16 is a calculated intensity contour plot of output light 1490. The light source had an overall extraction efficiency of about 50%.

EXAMPLE 3

Figure 17:
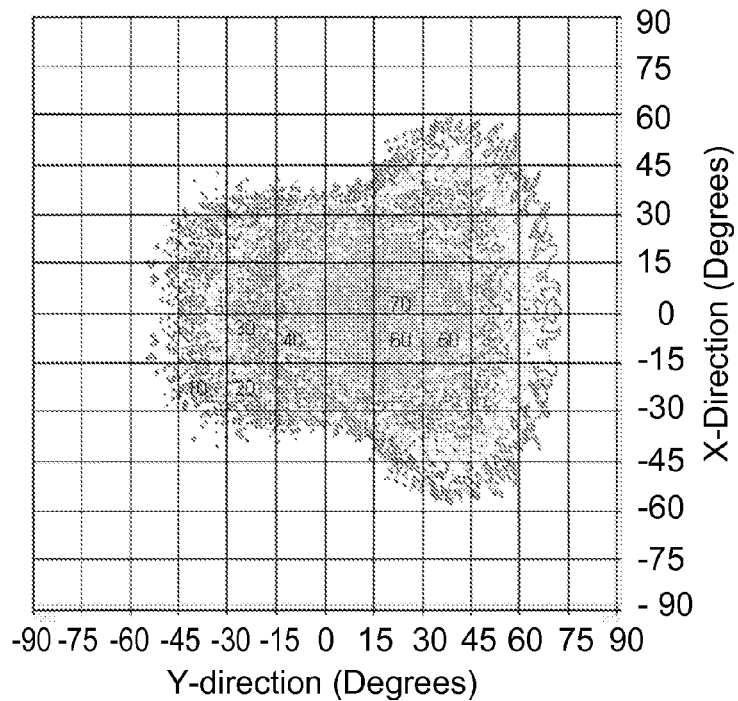
FIG. 17 is an intensity contour plot of the output of another light source.

A light source similar to light source 1400 in Example 2 was numerically modeled except that back reflector 1470 had a reflectance of 0% and absorbed all light rays incident on the reflector. FIG. 17 is a calculated intensity contour plot of output light 1490. An absorbing back reflector 1470 resulted in a narrower intensity distribution of the output light.

The disclosed lightguides and light sources can be quite small and can advantageously be employed in many applications where it is desirable to have a small extended light source that emits light along a particular direction. For example, the disclosed light sources can be used in general lighting applications, such as the lighting of a room or a particular area of a room. For example, a disclosed light source can advantageously be mounted under a kitchen cabinet to light a counter top without producing glare.

Figure 18:
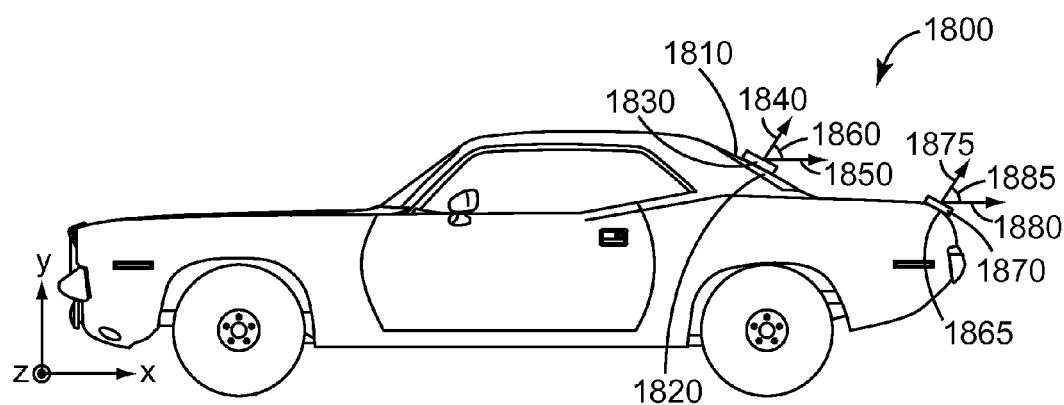
FIG. 18 is a schematic side-view of a motor vehicle.

As another example, in some cases, a disclosed light source can be a Center High Mounted Stop Lamp (CHMSL) in a motor vehicle. For example, FIG. 18 is a schematic side-view of a motor vehicle 1800 that includes a rear window assembly 1810 that includes a rear window 1820 and a light source 1830. Light source 1830 has a surface normal 1840 and emits light along a general emission direction 1850 toward, for example, another motor vehicle. Light source 1830 can be similar to any light source disclosed herein and can include a lightguide that is similar to any lightguide disclosed herein. For example, light source 1830 can be similar to light source 1000 with lamps 1020 and 1030 disposed on either side of lightguide 1010 along the z-direction.

In some cases, emission direction 1850 is substantially along the horizontal or x-direction. In such cases, emission angle 1860 which is the angle between emission direction 1850 and surface normal 1840, is in a range from about 10 degrees to about 40 degrees, or from about 15 degrees to about 30 degrees, or from about 15 degrees to about 25 degrees.

In the exemplary motor vehicle 1800, light source 1830 is mounted on or attached to rear window 1820. In general, light source 1830 can be placed in any location that may be desirable in an application. For example, car 1800 can have a CHMSL light source 1870 that is disposed on a trunk lid 1865 of motor vehicle 1800. Light source 1870 has a surface normal 1875 and emits light along a general emission direction 1880 toward, for example, another motor vehicle. Light source 1870 can be similar to any light source disclosed herein and can include a lightguide that is similar to any lightguide disclosed herein. For example, light source 1870 can be similar to light source 1000 with lamps 1020 and 1030 disposed on either side of lightguide 1010 along the z-direction. In some cases, emission direction 1880 is substantially along the horizontal or x-direction. In such cases, emission angle 1885 which is the angle between emission direction 1880 and surface normal 1875, is in a range from about 10 degrees to about 40 degrees, or from about 15 degrees to about 30 degrees, or from about 15 degrees to about 25 degrees.

As used herein, terms such as "vertical", "horizontal", "above", "below", "left", "right", "upper" and "lower", "clockwise" and "counter clockwise" and other similar terms, refer to relative positions as shown in the figures. In general, a physical embodiment can have a different orientation, and in that case, the terms are intended to refer to relative positions modified to the actual orientation of the device. For example, even if the image in FIG. 14B is flipped as compared to the orientation in the figure, surface 1412 is still considered to be the top major surface of lightguide 1410.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. A lightguide extending along a light emitting surface having a surface normal thereof, the lightguide comprising a plurality of light extractors configured to extract light out of the light emitting surface, each light extractor comprising:
    a first portion tilted with respect to the light emitting surface for light extraction; and
    a second portion having an associated surface substantially perpendicular to the light emitting surface to reflect light toward the first portion of at least one other light extractor,
    wherein the lightguide further comprises an edge to receive an incident light propagating within the lightguide along a general direction, and one or more lamps disposed along the edge to emit the incident light, and
    wherein the plurality of light extractors comprises a first plurality of light extractors and a second plurality of light extractors, the first plurality of light extractors are oriented to have the first portions to face the one or more lamps to receive light therefrom and with a twisted angle with respect to the received light from the lamps such that a general emission direction of light extracted by the first portions is tilted toward a side of the lightguide and has an angle relative to the surface normal of the light emitting surface in a range from about 10 degrees to about 40 degrees, and the second plurality of light extractors are oriented to have the associated surfaces of the second portions to face the one or more lamps to reflect light toward the first portion of at least one another light extractor for light extraction.

2. The lightguide of claim 1, wherein the light extractors in the plurality of light extractors are depressions.

3. The lightguide of claim 1, wherein the light extractors in the plurality of light extractors form a regular array.

4. The lightguide of claim 1, wherein the first portion of each light extractor comprises a planar portion, or is piecewise planar.

5. The lightguide of claim 1, wherein the first portion of each light extractor comprises a curved portion, or is piecewise curved.

6. The lightguide of claim 1, wherein the first portion of each light extractor is aspheric.

7. The lightguide of claim 1, wherein
    the first portions of the first plurality of light extractors face a first incident light from a first edge of the lightguide and the second portions of the first plurality of light extractors face away from the first incident light from the first edge; and
    the first portions of the second plurality of light extractors face a second incident from a second edge of the lightguide and the second portions of the second plurality of light extractors face away from the second incident light from the second edge.

8. The lightguide of claim 7, wherein:
    the second portions of the first plurality of light extractors face the second incident light from the second edge of the lightguide; and
    the second portions of the second plurality of light extractors face the first incident light from the first edge of the lightguide.

9. The lightguide of claim 7, wherein the first and second pluralities of light extractors are mirror images of each other.

10. The lightguide of claim 7, wherein the first and second edges are opposite to each other, and the associated surfaces of the second portions are twisted neither parallel nor perpendicular to either the first edge or the second edge.

11. The lightguide of claim 1 comprising:
    a structured surface opposite to the light emitting surface comprising the plurality of light extractors.

12. The lightguide of claim 11, wherein the light extractors in the plurality of light extractors form depressions in the structured bottom surface.

13. A light source comprising:
    the lightguide of claim 11;
    a back reflector disposed proximate the structured surface of the lightguide; and
    the one or more lamps disposed along the edge of the lightguide.

14. A rear window assembly or a trunk lid of a motor vehicle comprising the light source of claim 11.

15. The lightguide of claim 1, wherein each light extractor comprises a third portion not designed to either extract light or reflect light toward the first portion of at least one other light extractor for light extraction.

16. A light source comprising:
    a lightguide extending along a light emitting surface having a surface normal thereof, the lightguide comprising a plurality of light extractors configured to extract light out of the light emitting surface, each light extractor comprising a first portion tilted with respect to the light emitting surface to extract light from the lightguide and a second portion having an associated surface substantially perpendicular to the light emitting surface to reflect light toward the first portion of another light extractor for extraction from the lightguide;
    a first lamp disposed along a first edge of the lightguide to emit light entering the lightguide along a first general direction; and
    a second lamp disposed along a second edge of the lightguide different than the first edge to emit light entering the lightguide along a second general direction, wherein the plurality of light extractors comprises:
a first plurality of light extractors being oriented to have the first portions thereof to face the first lamp to receive light therefrom and with a twisted angle with respect to the received light from the first lamp such that a general emission direction of light extracted by the first portions is tilted toward a side of the lightguide and has an angle relative to the surface normal of the light emitting surface in a range from about 10 degrees to about 40 degrees, and have the associated surfaces of the second portions thereof to face the second lamp to reflect light that is emitted by the second lamp toward the first portion of at least one other light extractor for extraction from the lightguide; and
a second plurality of light extractors different from the first plurality of light extractors, the second plurality of light extractors being oriented to have the first portions thereof to face the second lamp to receive light therefrom and with a twisted angle with respect to the received light from the second lamp such that a general emission direction of light extracted by the first portions is tilted toward the same side of the lightguide and has an angle relative to the surface normal of the light emitting surface in a range from about 10 degrees to about 40 degrees, and have the associated surfaces of the second portions thereof to face the first lamp to reflect light that is emitted by the first lamp toward the first portion of at least one other light extractor for extraction from the lightguide.

17. The light source of claim 16, wherein the first and second edges are opposite to each other, and the associated surfaces of the second portions are twisted neither parallel nor perpendicular to either the first edge or the second edge.

\* \* \* \* \*